May 15, 1928. 1,669,883

K. TSCHOCHNER ET AL

VEHICLE TIRE

Filed Sept. 2, 1927

Patented May 15, 1928.

1,669,883

UNITED STATES PATENT OFFICE.

KARL TSCHOCHNER AND ERICH KAHLHAUPT, OF SCHRECKENSTEIN, NEAR AUSSIG-ON-THE-ELBE, CZECHOSLOVAKIA.

VEHICLE TIRE.

Application filed September 2, 1927, Serial No. 217,120, and in Czechoslovakia April 10, 1926.

Our invention relates to vehicle tires and more particularly to cushion tires and has for its object to produce a tire combining with maximum resiliency and flexibility great wearing quality so as to make the tire very durable.

The tire, according to this invention, is built up of a plurality of transversely disposed flat members cut from leather, or like material, divided into inner and outer groups, the individual members of these groups being so shaped that projecting portions are formed adapted to mesh with each other like the teeth of gear-wheels. The members of each group are secured together and to the members of an adjoining group by rivets, or other suitable fastening means.

Figure 1:
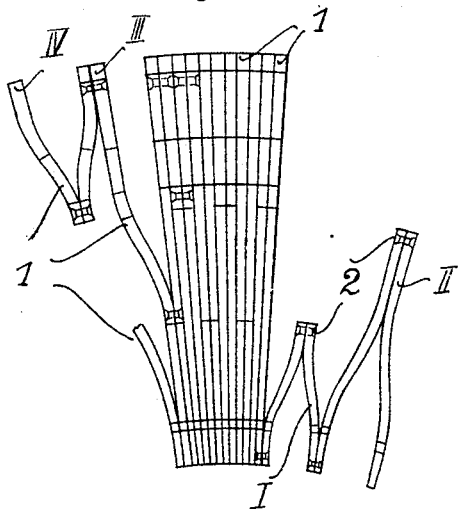
Figure 2:
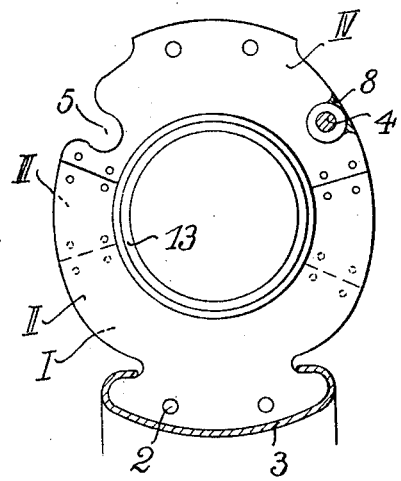
Figure 3:

For a fuller understanding of our invention, we refer to the annexed drawing, in which we have shown, by way of illustration, one way of producing the new tire, Fig. 1 showing a fragmentary portion of the tire, and Fig. 2 being a transverse section through the same showing the inner tube; Fig. 3 shows on a somewhat larger scale retaining means and Fig. 4 is a transverse section of Fig. 3.

As shown in the drawing, the tire is built up of flat members, cut from leather, or other suitable material which are so united as to form groups, some of which groups constitute the inner and others the outer circumference of the tire. In Fig. 1 four such groups are shown, to wit, two inner Groups I and II, and two outer Groups III and IV. The individual members of the inner Group I are fastened together, as, for instance, by rivets 2 and are also fastened to the adjoining members of the inner Group II, as clearly shown in Fig. 1. In like manner, the members of the two outer Groups III and IV are fastened together. As shown in the drawing, the members of Groups I and IV are shorter than the members of Groups II and III, and the shorter and longer members alternate in pairs so that as the two inner Groups I and II and the two outer Groups III and IV are assembled, the projecting portions formed by the longer members of each group of both the iner and outer groups will engage in the recesses formed by the shorter members of said groups, the said projecting portions fitting snugly into said recesses.

The two inner groups of members I and II are placed in the wheel-rim 3 (Fig. 2), the members of these two inner groups being shaped so as to fit into said rim and being securely held therein. The two outer Groups III and IV engaging the two inner groups I and II and constituting the tread of the tire are held together by circumferentially extending elastic or adjustable tension elements 4, which are placed into circumferential grooves 5 formed by notches in the members of the outer groups III and IV (Fig. 2). After the tension elements 4 have been placed into the grooves 5 and tightened, the grooves can be closed by a filler of rubber-cement or other material as indicated at 8 in Fig. 2.

Figure 4:
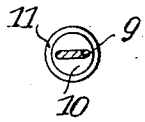

According to Figs. 3 and 4, the tension element 9 shown in said figures comprises a flat piece of metal onto which are threaded small disks 10 of leather, or the like which, in turn, are enclosed by a closely wound helical spring 11 which acts as a self-tensioning element.

The tire shown in Fig. 2 is shown as a hollow tire, or casing to receive an inner tube indicated at 13.

We claim:

1. In a vehicle tire, the combination with a rim, of a plurality of substantially flat members of wear-resisting material disposed transversely of the plane of the tire and arranged in inner groups adapted to be secured in said rim and outer groups forming the tread, adjacent members of said groups being of uneven lengths so as to form alternate mutually engaging recesses and projections, and circumferential means for holding said members in position.

2. In a vehicle tire, the combination with a rim, of a plurality of substantially flat members of wear-resisting material disposed transversely of the plane of the tire and arranged in inner groups adapted to be secured in said rim and outer groups forming the tread of the tire, the said groups composed of longer and shorter members alternating in pairs and secured together, the longer and shorter members of said inner and outer groups forming mutually engaging projections and recesses, and circumferential tension elements for holding said groups in place.

3. In a vehicle tire, the combination with a rim, of a plurality of substantially flat members of wear-resisting material disposed transversely of the plane of the tire and arranged in inner and outer groups respectively adapted to be secured in said rim and forming the tread of the tire, the said groups composed of longer and shorter members alternating in pairs, the longer and shorter members of said inner and outer groups forming mutually engaging projections and recesses and the members of said outer groups being provided with notches positioned in the side walls below the tread surface and forming continuous circumferential grooves in the assembled members, and circumferential tensional retaining elements embedded in said grooves.

4. In a vehicle tire, the combination with a rim, of a plurality of substantially flat members of wear-resisting material disposed transversely of the plane of the tire and arranged in inner and outer groups respectively adapted to be secured in said rim and forming the tread of the tire, the said groups composed of longer and shorter members alternating in pairs, the longer and shorter members of said inner and outer groups forming mutually engaging projections and recesses, and circumferential tension elements holding said groups in position, each tension element comprising an annular member, small disks placed thereon in juxta-position, and a helical spring surrounding said disks.

In testimony whereof we affix our signatures.

KARL TSCHOCHNER.
ERICH KAHLHAUPT.